United States Patent
Wolford et al.

(10) Patent No.: US 9,262,326 B2
(45) Date of Patent: Feb. 16, 2016

(54) METHOD AND APPARATUS TO ENABLE THE COOPERATIVE SIGNALING OF A SHARED BUS INTERRUPT IN A MULTI-RANK MEMORY SUBSYSTEM

(75) Inventors: Barry Joe Wolford, Cary, NC (US); James Edward Sullivan, Jr., Cary, NC (US)

(73) Assignee: QUALCOMM Incorporated, San Diego, CA (US)

(*) Notice: Subject to any disclaimer, the term of this patent is extended or adjusted under 35 U.S.C. 154(b) by 688 days.

(21) Appl. No.: 11/565,034

(22) Filed: Nov. 30, 2006

(65) Prior Publication Data
US 2008/0040559 A1    Feb. 14, 2008

Related U.S. Application Data

(60) Provisional application No. 60/822,279, filed on Aug. 14, 2006.

(51) Int. Cl.
*G06F 12/08* (2006.01)
*G06F 13/16* (2006.01)

(52) U.S. Cl.
CPC ........ *G06F 12/0844* (2013.01); *G06F 13/1647* (2013.01)

(58) Field of Classification Search
None
See application file for complete search history.

(56) References Cited

U.S. PATENT DOCUMENTS

| | | | |
|---|---|---|---|
| 4,010,449 A * | 3/1977 | Faggin et al. ............ 710/100 |
| 4,363,108 A | 12/1982 | Lange et al. |
| 5,216,672 A | 6/1993 | Tatosian et al. |
| 5,278,796 A | 1/1994 | Tillinghast et al. |
| 5,600,281 A | 2/1997 | Mori et al. |
| 5,640,521 A | 6/1997 | Whetsel |
| 5,671,393 A * | 9/1997 | Yamaki et al. ............ 711/150 |
| 5,699,302 A | 12/1997 | Shinozaki et al. |
| 5,787,255 A | 7/1998 | Parlan et al. |
| 5,860,080 A | 1/1999 | James et al. |

(Continued)

FOREIGN PATENT DOCUMENTS

| EP | 0797207 A2 | 9/1997 |
|---|---|---|
| EP | 0851427 A2 | 7/1998 |

(Continued)

OTHER PUBLICATIONS

International Search Report-PCT/US07/075517, International Search Authority—European Patent Office—Mar. 17, 2008.

(Continued)

*Primary Examiner* — Charles Rones
*Assistant Examiner* — Ryan Dare
(74) *Attorney, Agent, or Firm* — Peter Michael Kamarchik; Paul Holdaway

(57) ABSTRACT

A memory system is disclosed. The memory system includes first and second memory devices, and a memory controller configured to selectively enable one of the memory devices, the memory controller having a first line coupled to the first and second memory devices and a second line coupled to the first and second memory devices. The first memory device is configured to provide a notification to the memory controller on the first line and the second memory device is configured to provide a notification to the memory controller on the second line. The first memory device is further configured not to load the first line and the second memory device is further configured not to load the second line when the memory controller is writing to the enabled memory device.

36 Claims, 7 Drawing Sheets

(56) References Cited

U.S. PATENT DOCUMENTS

| | | | |
|---|---|---|---|
| 5,963,482 A | 10/1999 | Zheng | |
| 5,982,697 A | 11/1999 | Williams et al. | |
| 6,038,177 A * | 3/2000 | Rajith et al. | 365/189.05 |
| 6,049,856 A | 4/2000 | Bolyn | |
| 6,134,167 A | 10/2000 | Atkinson | |
| 6,154,816 A | 11/2000 | Steely et al. | |
| 6,236,593 B1 | 5/2001 | Hong et al. | |
| 6,275,420 B1 | 8/2001 | Fujita et al. | |
| 6,279,084 B1 | 8/2001 | VanDoren et al. | |
| 6,324,482 B1 | 11/2001 | Nakagaki et al. | |
| 6,373,768 B2 | 4/2002 | Woo et al. | |
| 6,401,213 B1 | 6/2002 | Jeddeloh | |
| 6,415,364 B1 * | 7/2002 | Bauman et al. | 711/155 |
| 6,430,634 B1 | 8/2002 | Mito | |
| 6,438,057 B1 | 8/2002 | Ruckerbauer | |
| 6,449,685 B1 | 9/2002 | Leung | |
| 6,453,218 B1 | 9/2002 | Vergis | |
| 6,487,629 B1 | 11/2002 | Shibata | |
| 6,489,831 B1 | 12/2002 | Matranga et al. | |
| 6,594,748 B1 | 7/2003 | Lin | |
| 6,643,194 B2 | 11/2003 | Ryan et al. | |
| 6,665,755 B2 | 12/2003 | Modelski et al. | |
| 6,667,905 B2 | 12/2003 | Dono et al. | |
| 6,728,798 B1 | 4/2004 | Roohparvar | |
| 6,757,857 B2 | 6/2004 | Lamb et al. | |
| 6,778,459 B2 | 8/2004 | Blodgett | |
| 6,918,016 B1 | 7/2005 | Magro | |
| 6,937,958 B2 | 8/2005 | Gold et al. | |
| 6,957,308 B1 | 10/2005 | Patel | |
| 7,024,518 B2 | 4/2006 | Halbert et al. | |
| 7,046,538 B2 * | 5/2006 | Kinsley et al. | 365/52 |
| 7,055,012 B2 | 5/2006 | LaBerge et al. | |
| 7,096,283 B2 | 8/2006 | Roohparvar | |
| 7,230,876 B2 | 6/2007 | Walker | |
| 7,251,192 B2 | 7/2007 | Walker | |
| 7,304,905 B2 | 12/2007 | Hsu et al. | |
| 7,395,176 B2 | 7/2008 | Chung et al. | |
| 7,421,525 B2 | 9/2008 | Polzin et al. | |
| 7,593,279 B2 | 9/2009 | Wolford et al. | |
| 7,620,783 B2 * | 11/2009 | Wolford et al. | 711/156 |
| 7,953,921 B2 | 5/2011 | Walker et al. | |
| 8,122,187 B2 | 2/2012 | Walker et al. | |
| 2001/0011318 A1 | 8/2001 | Dalvi et al. | |
| 2001/0018724 A1* | 8/2001 | Sukegawa | 711/103 |
| 2001/0032290 A1* | 10/2001 | Williams | 711/104 |
| 2002/0015328 A1 | 2/2002 | Dono et al. | |
| 2002/0078282 A1 | 6/2002 | Drerup et al. | |
| 2002/0152351 A1 | 10/2002 | Tanaka | |
| 2002/0180543 A1 | 12/2002 | Song et al. | |
| 2003/0021137 A1 | 1/2003 | Johnson et al. | |
| 2003/0126353 A1 | 7/2003 | Satoh et al. | |
| 2004/0071191 A1 | 4/2004 | Sim et al. | |
| 2004/0139288 A1 | 7/2004 | Perego et al. | |
| 2005/0044305 A1* | 2/2005 | Jakobs et al. | 711/105 |
| 2005/0060481 A1 | 3/2005 | Belonoznik | |
| 2005/0076169 A1 | 4/2005 | Modelski et al. | |
| 2005/0160218 A1 | 7/2005 | See et al. | |
| 2005/0240744 A1 | 10/2005 | Shaikh et al. | |
| 2005/0289428 A1 | 12/2005 | Ong | |
| 2006/0044860 A1 | 3/2006 | Kinsley et al. | |
| 2006/0239095 A1 | 10/2006 | Shi et al. | |
| 2006/0265615 A1 | 11/2006 | Janzen et al. | |
| 2006/0294294 A1 | 12/2006 | Walker | |
| 2007/0214335 A1* | 9/2007 | Bellows et al. | 711/167 |

FOREIGN PATENT DOCUMENTS

| | | |
|---|---|---|
| JP | 06175747 | 6/1994 |
| JP | 8124380 | 5/1996 |
| JP | 8315569 | 11/1996 |
| JP | 9259582 A | 10/1997 |
| JP | H10198599 A | 7/1998 |
| JP | 11353887 A | 12/1999 |
| JP | 2000067576 A | 3/2000 |
| JP | 2001043671 A | 2/2001 |
| JP | 2002025288 A | 1/2002 |
| JP | 2002343079 | 11/2002 |
| JP | 2004055404 | 2/2004 |
| JP | 2004295946 A | 10/2004 |
| JP | 2005032428 | 2/2005 |
| JP | 2008505429 | 2/2008 |
| JP | 2008530721 A | 8/2008 |
| JP | 2014121770 A | 7/2014 |
| KR | 2003044314 | 6/2003 |
| KR | 20100108697 A | 10/2010 |
| RU | 2157562 | 10/2000 |
| WO | WO0011675 A1 | 3/2000 |
| WO | 0211148 A1 | 2/2002 |
| WO | 2005106887 A1 | 11/2005 |
| WO | WO2006089313 A2 | 8/2006 |
| WO | WO2008011148 A2 | 1/2008 |

OTHER PUBLICATIONS

Written Opinion—PCT/US07/075517, International Search Authority—European Patnent Office-Mar. 17, 2008.

Gillingham P et al., "SLDRAM:High Performance, Open-Standard Memory" IEEE Micro, IEEE Service Center, Los Alamitos, CA, US, vol. 17, No. 6, Nov. 1997, pp. 29-39, XP000726002 ISSN: 0272-1732.

Jedec Standard: "Double Data Rate (DDR) SDRAM Specification", JESD79E (May 2005), pp. 1-78.

European Search Report—EP13184859—Search Authority—Munich—Nov. 13, 2013.

* cited by examiner

METHOD AND APPARATUS TO ENABLE THE COOPERATIVE SIGNALING OF A SHARED BUS INTERRUPT IN A MULTI-RANK MEMORY SUBSYSTEM

CLAIM OF PRIORITY UNDER 35 U.S.C. §119

The present Application for Patent claims priority to Provisional Application No. 60/822,279 entitled "Method and Apparatus to Enable the Cooperative Signaling of a Shared Bus Interrupt in a Multi-Rank Memory Subsystem" filed Aug. 14, 2006, and assigned to the assignee hereof and hereby expressly incorporated by reference herein.

FIELD

The present disclosure relates generally to memory systems, and more specifically, to signaling between a memory controller and memory in a memory system.

BACKGROUND

Memory systems are used extensively today in processing systems to store data needed by various processing entities. A memory system generally includes a memory controller that manages access to the memory. The memory is typically configured in a matrix structure formed by rows and columns of memory cells, with each memory cell being capable of storing a bit of data. A block of memory cells may be accessed by a processing entity, or other source, by providing the appropriate address to the memory controller. The address from the processing entity may be sent to the memory controller over a bus with the row address occupying the higher-order bits and the starting column address occupying the lower-order bits. The memory controller uses a multiplexing scheme to send the row address to the memory followed by the starting column address.

When a processing entity requires access to a block of memory, it sends a read or write command to the memory controller. Each read and write command includes an address. The manner in which the memory controller executes each command depends on whether the processing entity is attempting to access an open page in the memory. A "page" is normally associated with a row of memory, and an "open page" means that the memory is pointing to a row of memory and requires only the starting column address and a column access strobe (CAS) to access the block of memory. To access an unopened page of memory, the memory controller must present the row address and a row access strobe (RAS) to the memory to move the pointer before presenting the starting column address and the CAS to the memory.

Various memories are used today in memory systems. A Synchronous Dynamic Random Access Memory (SDRAM) is just one example. When a processing entity is writing to a SDRAM, or other memory device, data is transmitted over a data bus between the memory controller and the memory. A data mask may be used by the memory controller to mask data on the data bus. When the data mask is deasserted, the data on the data bus will be written to the memory. When the data mask is asserted, the data on the data bus will be ignored, and the write operation will not be performed.

The data mask is only used during write operations. When a processing entity is not writing to the SDRAM, or other memory device, the memory controller tri-states the data mask. Thus, there exists an opportunity to use the data mask for other purposes when the processing entity is not performing a write operation. By utilizing the data mask in this way, additional communications can occur between the memory controller and the memory without increasing the number of pins on the memory device.

SUMMARY

One aspect of a memory system is disclosed. The memory system includes first and second memory devices, and a memory controller configured to selectively enable one of the memory devices, the memory controller having a first line coupled to the first and second memory devices and a second line coupled to the first and second memory devices. The first memory device is configured to provide a notification to the memory controller on the first line and the second memory device is configured to provide a notification to the memory controller on the second line. The first memory device is further configured not to load the first line and the second memory device is further configured not to load the second line when the memory controller is writing to the enabled memory device.

Another aspect of a memory system is disclosed. The memory system includes first and second memory ranks, each of the memory ranks having a memory device, and a memory controller configured to selectively enable one of the memory ranks and write data to the enabled memory rank, the memory controller having first and second lines, each being coupled to the first and second memory ranks, the first and second lines being configured to provide a data mask relating to the data. The memory device in the first memory rank is configured to provide a notification to the memory controller on the first line and the memory device in the second memory rank is configured to provide a notification to the memory controller on the second line.

One aspect of a method of communicating between a memory controller and a memory having first and second memory devices is disclosed. The memory controller includes a line coupled to the first and second memory devices. The method includes providing a notification from the first memory device to the memory controller on the first line, enabling the second memory device in order for the memory controller to write to the second memory device, and placing the first memory device into a state that does not load the line when the memory controller is writing to the second memory device.

Another aspect of a method of communicating between a memory controller and memory having first and second memory ranks is disclosed. Each of the memory ranks includes a memory device. The memory controller includes a first line coupled to the memory device in the first rank and a second line coupled to the memory device in the second rank. The method includes providing a notification from the memory device in the first memory rank to the memory controller on the first line, enabling the second memory rank in order for the memory controller to write to the second memory rank, providing a data mask from the memory controller to the second memory rank on the first and second lines when the memory controller is writing to the second memory device.

A further aspect of a memory system is disclosed. The memory system includes first and second memory devices, and memory controller configured to selectively enable one of the memory devices, the memory controller having a first line coupled to the first and second memory devices and a second line coupled to the first and second memory devices. The first memory device further includes means for providing a notification to the memory controller on the first line and the second memory device includes means for providing a notification to the memory controller on the second line. The means for providing notification to the memory controller on the first line and the means for providing notification to the memory controller on the second line are each configured not to load its respective line when the memory controller is writing to the enabled memory device.

Another aspect of a memory system is disclosed. The memory system includes first and second memory ranks, each of the memory ranks having a memory device, and a memory controller configured to selectively enable one of the memory ranks and write data to the enabled memory rank. The memory controller having first and second lines, each being coupled to the first and second memory ranks, the first and second lines being configured to output a data mask relating to the data. The memory device in the first memory rank includes means for providing a notification to the memory controller on the first line and the memory device in the second memory rank includes means for providing a notification to the memory controller on the second line.

It is understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
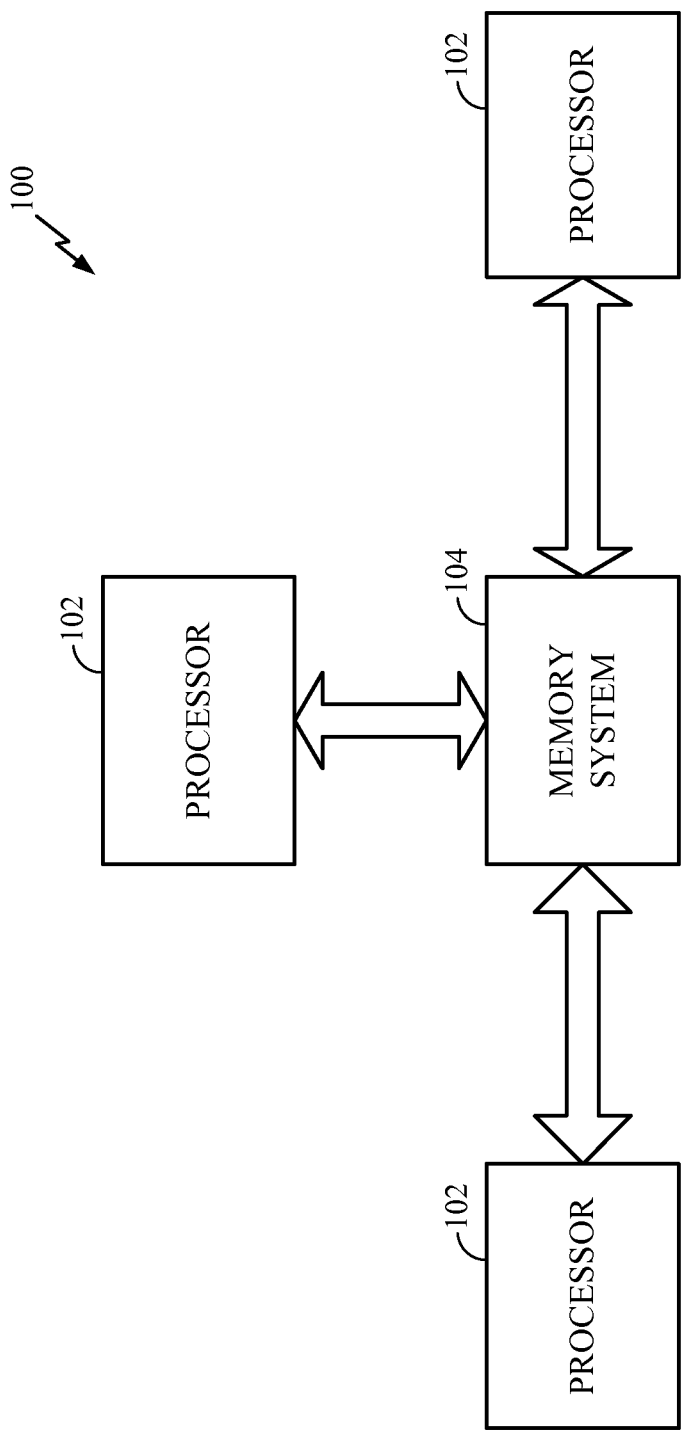
FIG. 1 is a conceptual block diagram illustrating an example of a processing system.

FIG. 1 is a conceptual block diagram illustrating an example of a processing system. The processing system 100 may be a collection of devices that cooperate to perform one or more processing functions. Typical applications for the processing system 100 include, but are not limited to, desktop computers, laptop computers, servers, cellular phones, personal digital assistants (PDA), game consoles, pagers, modems, audio equipment, medical devices, automotive, video equipment, industrial equipment, or any other machine or device capable of processing, retrieving and storing information.

The processing system 100 is shown with a memory system 104 that may be accessed by any number of processing entities. In the configuration shown in FIG. 1, three processors 102 are shown in communication with the memory system 104. Each processor 102 may be a general purpose processor, such as a microprocessor, a special purpose processor, such as a digital signal processor (DSP), an application specific integrated circuit (ASIC), a direct memory access (DMA) controller, a bridge, a programmable logic component, or any other entity that requires access to the memory system 104.

Figure 2:
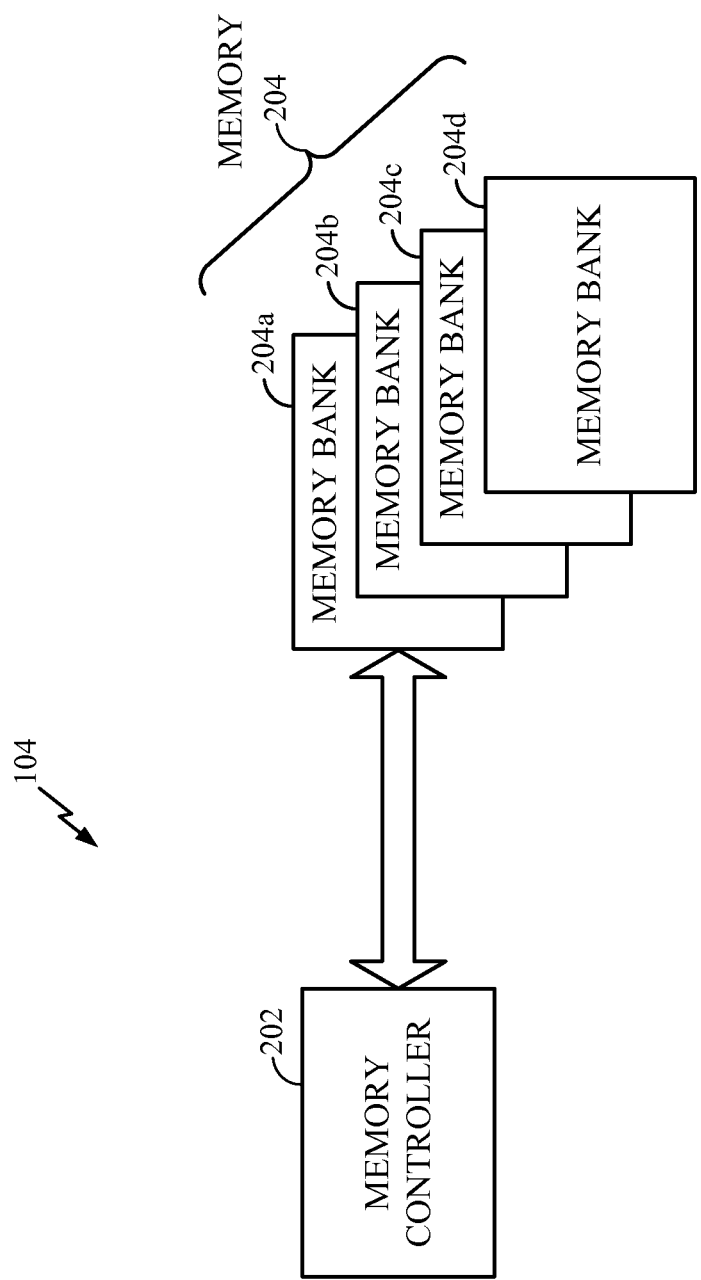
FIG. 2 is a conceptual block diagram of a memory system.

FIG. 2 is a conceptual block diagram of a memory system. The memory system 104 includes a memory controller 202 that manages access to memory 204. The memory 204 is shown in FIG. 2 as a multiple-bank memory device with four banks 204a-204d, but may have any number of banks depending on the particular application. A multiple-bank memory device may be thought of as a series of separate memories integrated into a single piece of silicon. In alternative embodiments of the memory system 104, the memory controller 202 may be configured to manage access to multiple memory devices, with each memory device being a single-bank or multiple-bank device. Those skilled in the art will readily appreciate that the various concepts described throughout this disclosure may be applied to memory systems with different configurations.

The memory controller 202 may be any entity that controls the operation of one or more memory devices including a dedicated memory controller chip, a processor that directly controls the memory, controller circuitry on the memory device, or any other suitable arrangement. Each memory device may be any type of temporary storage device such as a SDRAM, DRAM, or RAM, or a longer term storage device such as flash memory, ROM memory, EPROM memory, EEPROM memory, etc. In this example, the memory devices will be described in the context of a SDRAM, however, the various concepts described throughout this disclosure may be extended to other memory devices.

Figure 3:
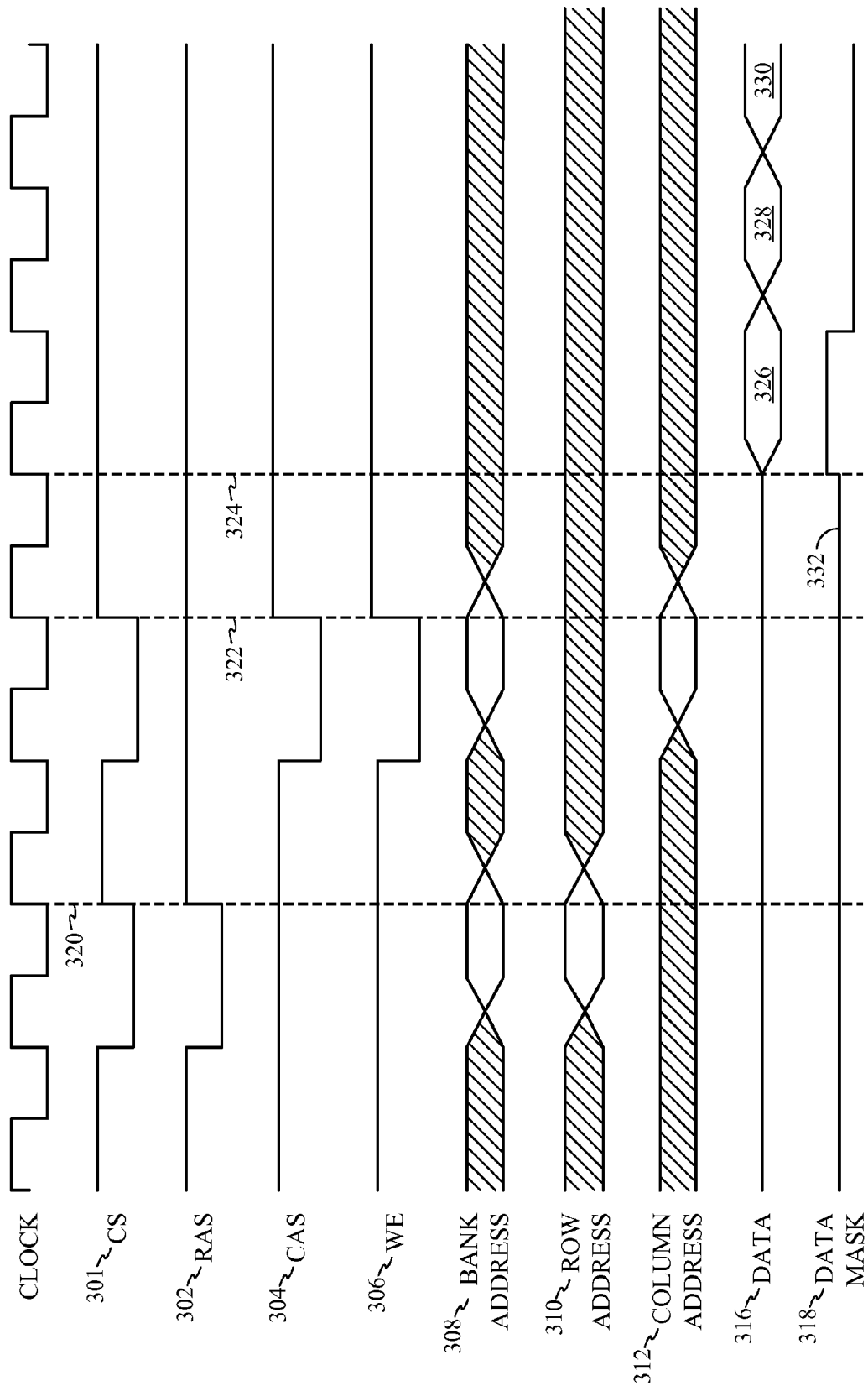
FIG. 3 is a timing diagram illustrating an example of a write operation in a memory system.

An example of a write operation to the memory device will be described with the reference to timing diagram of FIG. 3. The memory device is enabled by asserting the chip select (CS) 301. Before a read or write operation can be performed to a bank within the memory device, a row in that bank must be opened. This is accomplished by sending both the bank address 308 and the row address 310 to the memory device and asserting the CS 301 and the RAS 302 by driving it into a logic "0" state at time 320. In this example, all control signals, except for the data mask, are "asserted" with a logic "0" state, however, the polarities may be switched in practice.

Once a row is opened in a memory device, the memory controller may read from or write to that row. At time 322, the memory controller initiates a write operation by sending the bank address 308 and the starting column address 312 to the memory device and asserting the CS 301, the CAS 304 and the write enable (WE) 306. After a predetermined delay following the assertion of the WE 306, the memory controller begins transmitting the data to be written to the memory device on the data bus 316 (see time 324). The memory device will ignore the data on the bus 316, and not perform a write operation, when the data mask is asserted. In this example, the data mask is asserted (i.e., driven into a logic "1" state) during the first data tenure 326. As a result, that data is not written to the memory device. During the second 328 and third 330 data tenures, the data mask is deaserted, and the data transmitted on the bus 316 is written to the memory device. As pointed out earlier, the polarity of an asserted data mask is chosen in this example for convenience of explanation, but may be any polarity in practice. Prior to such as time 332, and following, the write operation, the data bus 316 and data mask 318 are not loaded, for example, driven into a high impedance state or tri-stated.

Figure 4:
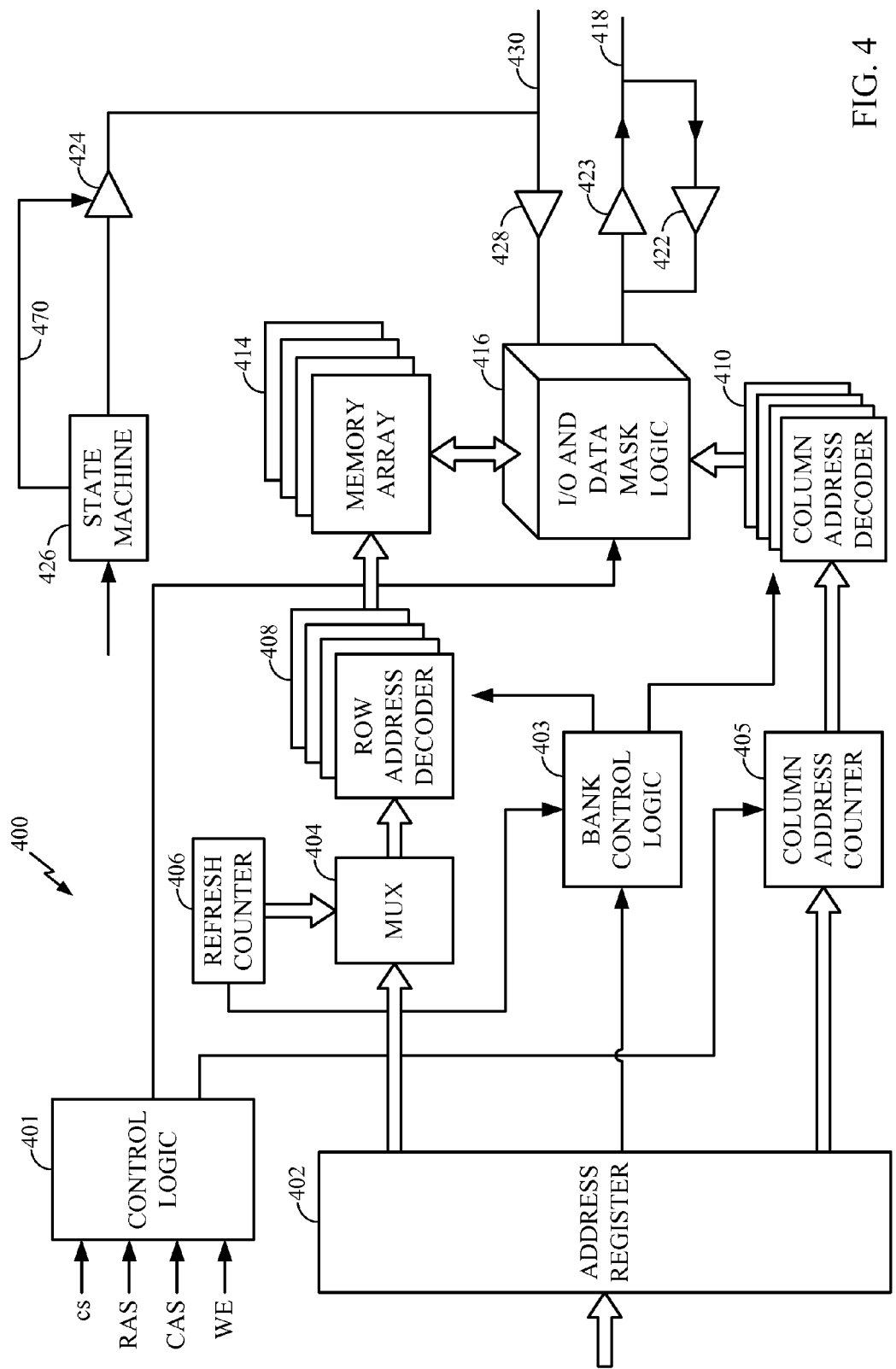
FIG. 4 is a functional block diagram illustrating an example of a memory device.

FIG. 4 is a functional block diagram illustrating an example of a memory device 400. The memory device 400 includes control logic 401 that receives a CS, RAS, CAS and WE from the memory controller (not shown) and generates the appropriate triggers to perform read and write operations.

The memory device 400 also includes an address register 402 which receives an address from the memory controller. The address register 402 separates the addresses, sending the bank address to bank control logic 403, the row address to a multiplexer 404, and the starting column address to a column address counter 405. The bank control logic 403 selects the decoders from the row and column address decoders 408, 410 based on the bank address. The multiplexer 404 multiplexes the row address from the address register 402 with the output from a refresh counter 406 to the selected decoder in the row address decoder 408. The refresh counter 406 is used to generate a series of row addresses during a refresh period. The selected decoder in the row address decoder 408 decodes the row address when it receives a trigger from the control logic 401. The decoded row address is provided to the memory array 414 to open a row in the memory bank controlled by the selected decoder in the row address decoder 408.

Once the row is opened in the memory bank, the starting column address is output from the column address counter 405 when it receives a trigger from the control logic 401. Subsequent triggers from the control logic 401 are used to increment the column address counter 405 to create a series of column addresses sufficient to access a block of memory in the memory bank row to complete the read or write operation. The column address is provided to the decoder in the column address decoder 410 selected by the bank control logic 405. The selected decoder decodes the column address and provides the decoded address to an I/O and data mask logic unit 416. A signal from the control logic 401 is also provided to the I/O and data mask logic 416 to indicate whether the bus transaction is a read or write operation. In the case of a read operation, the contents of the memory array 414 specified by the bank, row, and column address is read into the I/O and data mask logic 416 before being transmitted to the memory controller by a data bus driver 423 via a bus driver 418. In the case of a write operation, the data on the data bus 418 is provided to the I/O and data mask logic 416 by a bus receiver 422. The data mask 430 is also provided to the I/O and data mask logic 416 by a data mask receiver 428. If the data mask is deasserted, the I/O and data mask logic 416 writes the data to the specified address in the memory array 414. If, on the other hand, the data mask is asserted, the data is ignored and the write operation is not performed.

As explained earlier, the data mask is tri-stated except when the memory controller is writing to the memory device 400. During that time, the data mask may be used to provide information or some type of notification to the memory controller. In one configuration of the memory device 400, the data mask may be used to indicate to the memory controller that there has been a change in status of the memory device 400. This concept may be used to eliminate the need of the memory controller to poll the status of the memory device 400 and provide the memory controller to be event driven. By way of example, and without limitation, the memory device 400 may use the data mask to indicate a change in temperature. Alternatively, or in addition to, the data mask may be used to indicate a timing error, such as a refresh error. The data mask may also be used to indicate an ECC (error-correcting code) error. Those skill in the art will be readily able to determine the information or the types of notifications best suited for any particular application.

A state machine 426, or other entity, is used to monitor changes in the status of the memory device 400. When a change is detected, a signal or interrupt is output from the state machine 426 and provided to the input of a data mask driver 424. The state machine 426 also provides an enable signal 470 to the data mask driver 424. The enable signal 470 is disabled from the data mask driver 424 when a write operation is being performed. By disabling the enable signal, the data mask driver 424 is forced into a tri-state condition, which allows the memory controller to use the data mask during the write operation. In one embodiment, the state machine 426 includes an internal timer (not shown) whose output controls the enable signal. The internal timer (not shown) is triggered or activated when the WE is asserted and remains activated for a time period sufficient to complete the write operation. The enable signal is removed from the data mask driver 424 while the internal timer (not shown) is activated.

Figure 5:
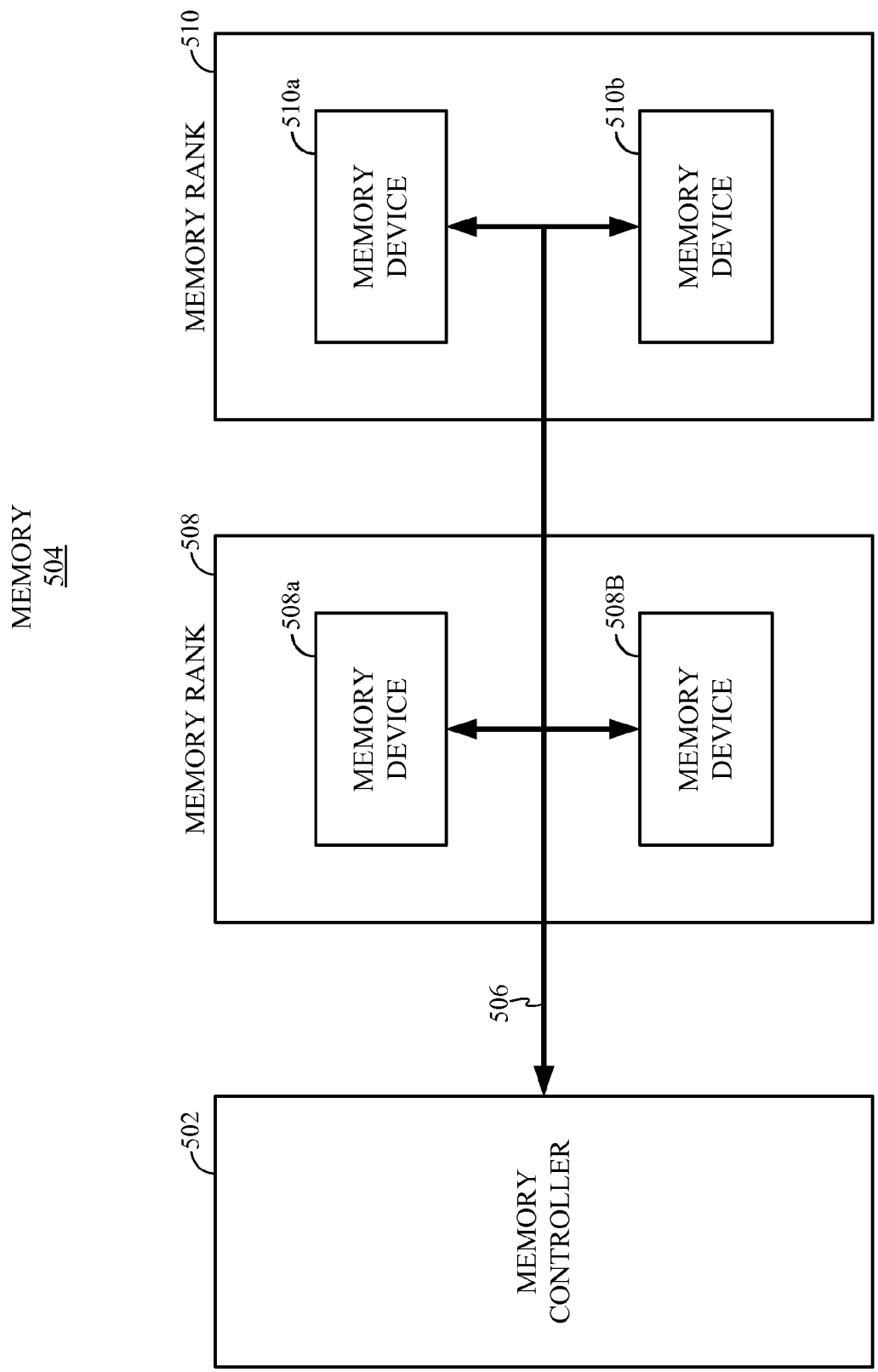
FIG. 5 is a conceptual block diagram illustrating another example of a memory system.

FIG. 5 is a conceptual block diagram illustrating another example of a memory system. In this example, a memory controller 502 is shown in communication with a two rank memory 504 over a 32-bit data bus 506. The first rank 508 includes two 16-bit wide memory devices 508a-508b connected together to support a 32-bit bus connection. By way of example, the memory device 508a may be used for the lower-order bits and the memory device 508b may be used for the higher-order bits of any bus transaction. The second rank 510 also includes two 16-bit wide memory devices 510a-510b connected together in a similar fashion. Each memory device 508a-508b, 510a-510b may be a single-bank or multiple-bank device.

The signaling and addressing scheme between the memory controller 502 and the memory 504 is similar to that described in connection with FIG. 3 with the a common CS for each memory device in a rank. This common CS may be referred to as a rank select (RS) because it selects all the memory devices in a rank. In this example, the memory controller 502 sends an address over the data bus 506 to the memory devices in the selected rank, and asserts a RAS to open a row in a bank of a memory device and asserts a CAS to read from or write to that row. In the case of a write operation, the memory controller also asserts a WE.

Figure 6:
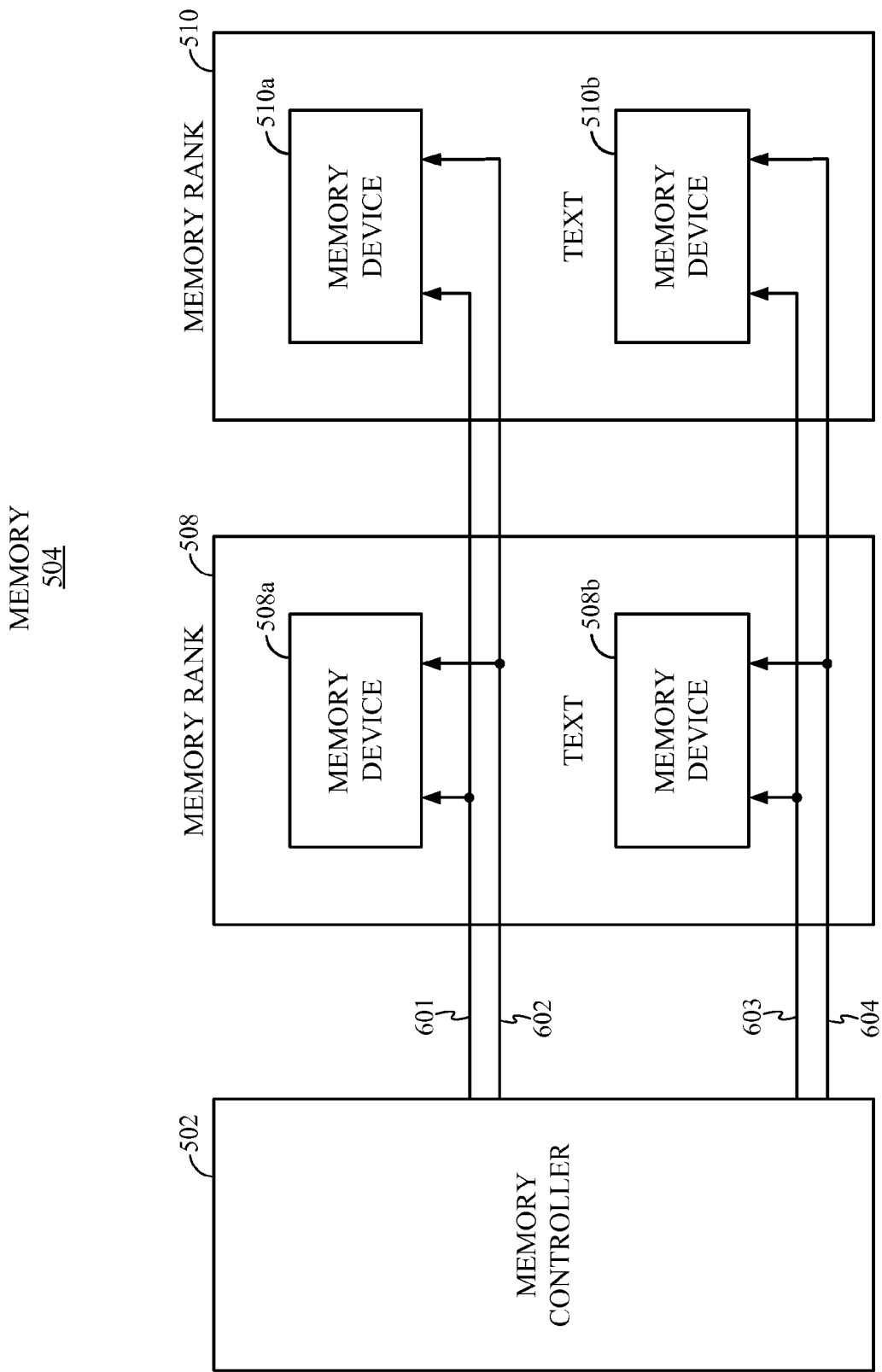
FIG. 6 is a conceptual block diagram illustrating an example of the signaling in the memory system of FIG. 5.

FIG. 6 is a conceptual block diagram illustrating an example of the data mask signaling in the memory system of FIG. 5. A data mask may be provided for each byte lane on the data bus 506 (see FIG. 5). Since there are four byte lanes on the bus (i.e., 32-bits), there are four data masks 601-604. The memory devices 508a, 510a connected to the two byte lanes carrying the lower-order bits receive two data masks 601, 602. The memory devices 508b, 510b connected the two byte lanes carrying the higher-order bits receive the other two data masks 603, 604. The four data masks 601-604 are utilized to facilitate the transmission of data between the memory controller 502 and the memory 504 when only a portion of the data bus is used. By way of example, a bus transaction may require only the writing of a single byte to the memory 504. The memory controller 502 may perform this bus transaction by transmitting the data on a single byte lane of the data bus and asserting the data masks for the other byte lanes. The data masks are used by the memory rank with the asserted RS to determine which byte lane the data is being transmitted on.

The data masks 601-604 may also be used by the memory 504 to indicate a change of status as discussed earlier in connection with FIG. 4. A different data mask may be assigned to each memory device 508a-508b, 510a-510b to provide a signal or interrupt to the memory controller when a write operation is not being performed. By way of example, the first data mask 601 may be assigned to the memory device 508a handling the lower-order bits in the first rank 508, the second data mask 602 may be assigned to the memory device 510a handling the lower-order bits in the second rank 510, the third data mask 603 may be assigned to the memory device 508b handling the higher-order bits in the first rank 508, and the fourth data mask 601 may be assigned to the memory device 510b handling the higher-order bits in the second rank 510. The memory controller can determine which of the four memory devices 508a-508b, 510a-510b is sending information or a notification based on the particular data mask carrying the signal or interrupt. All four data masks 601-604 may not be loaded by the memory devices 508a, 508b, 510a, 510b during a write operation to any of the memory devices. Various methods may be used to ensure that the data masks 601-604 are not loaded by the memory devices 508a, 508b, 510a, 510b during a write operation including tri-stating the lines, terminating the lines, switching techniques, etc.

Figure 7:
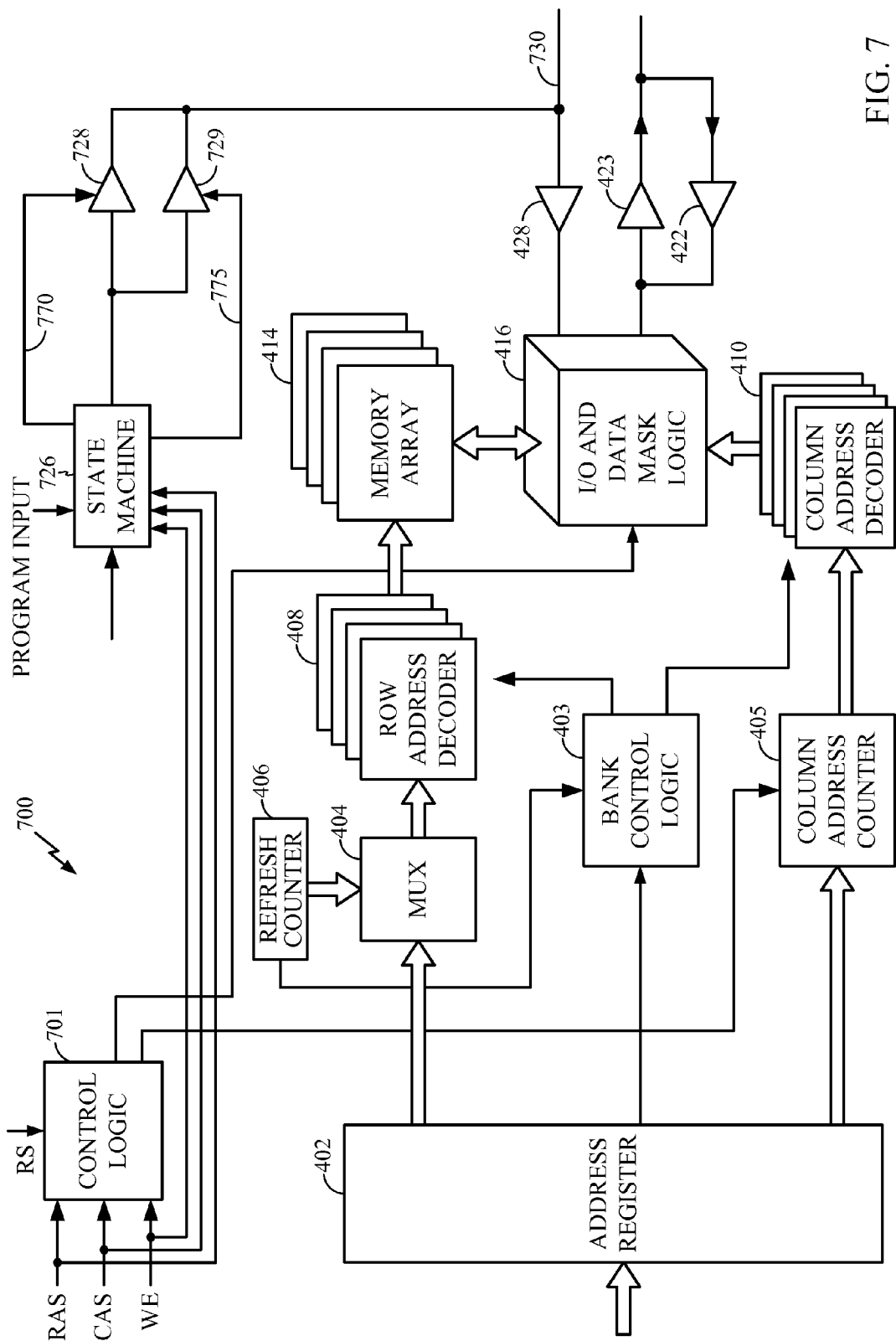
FIG. 7 is a functional block diagram illustrating another example of a memory device.

FIG. 7 is a functional block diagram of a memory device of FIG. 6. In this example, control logic 701 receives the RAS, CAS, and WE from the memory controller (not shown). With the RS asserted, the control logic 701 generates the appropriate triggers to perform read and write operations. The control logic 701 does not generate any triggers if the RS is deasserted.

The RAS, CAS, and WE are provided to the state machine 726 regardless of the state of the RS. As explained earlier in connection with FIG. 4, the WE may be used to trigger an internal timer (not shown) that removes the enable signal from the data mask driver 728 while the internal timer is activated. The internal timer is activated for a period of time sufficient to complete a write operation to a memory device in any rank of the memory system. When the internal timer is not activated, the data mask driver 728 may be used to send an interrupt or a signal to the memory controller to provide a notification of a change in status.

In one embodiment, the data mask used by the memory device 700 to indicate a change in status is programmable. In this embodiment, a data mask driver, either data mask driver 728 or 729, are provided for each change in status. As shown in FIG. 7, an equipment manufacturer, distributor, and/or user can select one of the two data mask drivers to act as an interrupt through a program input to the state machine 726. In response to the program input, the state machine 726 may select the data mask driver 728 by enabling enable signal 770 to drive data mask 730. In particular, the state machine 726 enables the data mask driver 728 as long as the internal time (not shown) is activated. By disabling enable signal 775, the other data mask driver 729 is disabled by the state machine 726, forcing that data mask driver 729 into a tri-state condition. A programming change can be made to select the other data mask driver by connecting the internal timer to the other data mask driver 729 and disabling the original data mask driver 728.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A memory system, comprising:
   a first memory device operable to perform a first write operation;
   a memory controller coupled to the first memory device via a first data mask line, wherein the memory controller is operable to selectively mask first write data during the first write operation via the first data mask line and wherein the first memory device is operable to provide first status information from the first memory device to the memory controller via the first data mask line when the first write operation is not being performed;
   a first data mask driver configured to provide the first status information to the memory controller on the first data mask line; and
   a first timer triggered by a write enable signal to disable the first data mask driver for a time period sufficient to complete the first write operation.

2. The memory system of claim 1, further comprising:
   a second memory device operable to perform a second write operation, the memory controller coupled to the second memory device via a data bus and a second data mask line, wherein the data bus is operable to communicate second write data between the second memory device and the memory controller, wherein the memory controller is operable to selectively mask the second write data during the second write operation via the second data mask line, wherein the second memory device is operable to provide second status information via the second data mask line from the second memory device to the memory controller when the second write operation is not being performed, wherein the second memory device includes a second data mask driver configured to provide the second status information to the memory controller on the second data mask line, and wherein the first and second memory devices are further configured to tri-state the first and second data mask drivers so as to not load the first and second data mask lines when the memory controller is writing to the first and second memory devices.

3. The memory system of claim 2, wherein the first memory device further comprises means for programming the first data mask driver to provide the first status information to the memory controller, and the second memory device comprises means for programming the second data mask driver to provide the second status information to the memory controller.

4. The memory system of claim 2, further comprising first and second ranks, the first rank comprising a first plurality of memory devices including the first memory device and the second rank comprising a second plurality of memory devices including the second memory device, and wherein the memory controller is further configured to enable the first memory device by enabling the first rank and enable the second memory device by enabling the second rank.

5. The memory system of claim 2, wherein the memory controller is further configured to provide a first data mask on the first data mask line when the memory controller is writing to the first memory device, wherein the memory controller is configured to provide a second data mask on the second data mask line when the memory controller is writing to the second memory device, and wherein the first data mask on the first data mask line and the second data mask on the second data mask line are independently configurable.

6. The memory system of claim 1, wherein the memory controller is further configured to signal the first write operation to the first memory device, wherein the first memory device is configured to tri-state the first data mask driver in response to the signal.

7. The memory system of claim 1, wherein the first status information provided to the memory controller by the first memory device indicates at least one of an error-correcting code (ECC) error in the first memory device, a change in temperature in the first memory device, and a timing error in the first memory device.

8. The memory system of claim 1, further comprising:

a second data mask driver configured to provide second status information to the memory controller on the first data mask line; and a state machine coupled to the first and second data masks, the state machine configured to receive a program input, wherein the program input is operable to select one of the first mask driver and the second mask driver to interrupt the memory controller.

9. The memory system of claim 1, wherein the first memory device is operable to provide the first status information via the first data mask line to enable the memory controller to be event driven.

10. A memory system, comprising:

first and second memory ranks, the first memory rank having a first memory device and the second memory rank having a second memory device, the first memory rank operable to perform a first write operation, the second memory rank operable to perform a second write operation; and a memory controller coupled to the first memory rank via a first data mask line, the memory controller coupled to the second memory rank via a second data mask line, wherein the memory controller is operable to selectively mask first write data during the first write operation via the first data mask line, wherein the first memory rank is operable to provide first status information from the first memory device to the memory controller via the first data mask line when the first write operation is not being performed, wherein the memory controller is operable to selectively mask second write data during the second write operation via the second data mask line, and wherein the second memory rank is operable to provide second status information via the second data mask line from the second memory rank to the memory controller when the second write operation is not being performed.

11. The memory system of claim 10, wherein the first memory device is configured to not load the first data mask line when the first write operation is performed, and wherein the second memory device is configured not to load the second data mask line when the second write operation is performed.

12. The memory system of claim 11, wherein the first memory device includes a first data mask driver configured to provide the first status information to the memory controller on the first data mask line and the second memory device includes a second data mask driver configured to provide the second status information to the memory controller on the second data mask line, and wherein the first memory device is configured to tri-state the first data mask driver so as to not load the first data mask line when the first write operation is performed, wherein the second memory device is configured to tri-state the second data mask driver so as to not load the second data mask line when the second write operation is performed.

13. The memory system of claim 12, wherein the first memory device is configured to tri-state the first data mask driver in response to a first write operation signal from the memory controller, wherein the second memory device is configured to tri-state the second data mask driver in response to a second write operation signal from the memory controller.

14. The memory system of claim 10, wherein the first memory device includes a first data mask driver coupled to the first data mask line, wherein the second memory device includes a second data mask driver coupled to the second data mask line, and wherein the first memory device is further configured to use the first data mask driver to provide the first status information to the memory controller and the second memory device is further configured to use the second data mask driver to provide the second status information to the memory controller.

15. The memory system of claim 14, wherein the first memory device further comprises means for programming the first data mask driver to provide the first status information to the memory controller and the second memory device comprises means for programming the second data mask driver to provide the second status information to the memory controller.

16. A method of communicating between a memory controller and a memory having first and second memory devices, the memory controller having a first data mask line coupled to the first memory device and a second data mask line coupled to the second memory device, the method comprising:
providing a first enable signal to a first data mask driver of the first memory device after completing a first write operation to the first memory device, wherein the memory controller selectively masks first write data during the first write operation via the first data mask line;
providing first status information from the first memory device to the memory controller via the first data mask line, wherein the first enable signal enables communication of the first status information to the memory controller via the first data mask line;
providing second status information from the second memory device to the memory controller on the second data mask line;
enabling the second memory device to perform a second write operation; and
providing a disable signal to a second data mask driver of the second memory device upon enabling the second memory device to perform the second write operation, wherein the memory controller selectively masks second write data during the second write operation via the second data mask line.

17. The method of claim 16, further comprising providing a data mask from the memory controller to the second memory device when the memory controller is performing the second write operation to the second memory device.

18. The method of claim 16, wherein the first status information provided to the memory controller by the first memory device indicates an error-correcting code (ECC) error.

19. A method of communicating between a memory controller and a memory having first and second memory ranks, the first memory rank having a first memory device and the second memory rank having a second memory device, and wherein the memory controller includes a first data mask line coupled to the first memory device and a second data mask line coupled to the second memory device, the method comprising:
providing a first enable signal to a first data mask driver of the first memory device after completing a first write operation to the first memory device, wherein the memory controller selectively masks first write data during the first write operation via the first data mask line;
providing first status information from the first memory device to the memory controller on the first data mask line, wherein the first enable signal enables communication of the first status information to the memory controller via the first data mask line;
providing second status information from the second memory device to the memory controller on the second data mask line;
enabling the second memory device to perform a second write operation;
providing a disable signal to a second data mask driver of the second memory device upon enabling the second memory device to perform the second write operation, wherein the memory controller selectively masks second write data during the second write operation via the second data mask line; and
selectively providing a data mask from the memory controller to the second memory device on the first data mask line when the memory controller is performing the second write operation.

20. The method of claim 19, further comprising placing the first memory device in the first memory rank into a state that does not load the first data mask line when the memory controller is performing the second write operation.

21. The method of claim 20, further comprising providing a write enable signal to the second memory rank to enable the second write operation, and using the write enable signal to place the first memory device in the first memory rank into the state that does not load the first data mask line when the memory controller is performing the second write operation.

22. The method of claim 19, wherein the first status information provided to the memory controller by the first memory device in the first memory rank indicates an error-correcting code (ECC) error.

23. A memory system, comprising:
a first memory device operable to perform a first write operation, the first memory device including a first data mask driver;
a second memory device operable to perform a second write operation, the second memory device including a second data mask driver; and
a memory controller coupled to the first memory device via a first data mask line, the memory controller coupled to the second memory device via a second data mask line,
wherein the memory controller is operable to tri-state the first data mask driver to allow the memory controller to selectively mask first write data during the first write operation via the first data mask line,
wherein the second memory device is responsive to the memory controller to tri-state the second data mask driver to allow the memory controller to selectively mask second write data during the second write operation via the second data mask line,
wherein the first memory device is operable to provide first status information from the first memory device to the memory controller via the first data mask line when the first write operation is not being performed, and
wherein the second memory device is operable to provide second status information via the second data mask line from the second memory device to the memory controller when the second write operation is not being performed.

24. A memory system, comprising:
a first memory rank having a first memory device, the first memory rank operable to perform a first write operation;
a second memory rank having a second memory device, the second memory rank operable to perform a second write operation; and
a memory controller coupled to the first memory rank via a first data mask line, the memory controller coupled to the second memory rank via a second data mask line,
wherein the memory controller is operable to enable selective masking of first write data during the first write operation via the first data mask line for a first time period,
wherein the first memory rank is operable to provide first status information from the first memory device to the memory controller via the first data mask line after the first time period,
wherein the memory controller is operable to enable selective masking of second write data during the second write operation via the second data mask line for a second time period, and wherein the second memory rank is operable to provide second status information via the second data mask line from the second memory rank to the memory controller after the second time period.

25. An apparatus comprising:
   means for storing write data;
   means for selectively masking the write data during a write operation via a data mask line, wherein the means for selectively masking the write data is coupled to the means for storing the write data via the data mask line, and wherein the means for storing the write data provides status information to the means for selectively masking the write data via the data mask line when the write operation is not being performed;
   means for providing the status information to the means for selectively masking the write data on the data mask line, and
   means for disabling the means for providing the status information for a time period sufficient to complete the write operation.

26. The apparatus of claim 25, wherein the means for storing the write data comprises a memory device, wherein the means for selectively masking the write data comprises a memory controller, wherein the means for providing the status information comprises a data mask driver, and wherein the means for disabling comprises a timer triggered by a write enable signal.

27. An apparatus comprising:
   means for storing first write data, wherein the means for storing the first write data includes a first memory device;
   means for storing second write data, wherein the means for storing the second write data includes a second memory device; and
   means for selectively masking the first write data and the second write data, wherein the means for selectively masking the first write data and the second write data is coupled to the means for storing the first write data via a first data mask line and to the means for storing the second write data via a second data mask line,
   wherein the first write data is selectively masked during a first write operation via the first data mask line,
   wherein the means for storing the first write data provides first status information from the first memory device to the means for selectively masking the first write data and the second write data via the first data mask line when the first write operation is not being performed,
   wherein the second write data is selectively masked during a second write operation via the second data mask line, and
   wherein the means for storing the second write data provides second status information from the second memory device to the means for selectively masking the first write data and the second write data via the second data mask line when the second write operation is not being performed.

28. The apparatus of claim 27, wherein the means for storing the first write data comprises a first memory rank, wherein the means for storing the second write data comprises a second memory rank, and wherein the means for selectively masking the first write data and the second write data comprises a memory controller.

29. A non-transitory computer-readable medium comprising instructions that, when executed by a processor, cause the processor to perform operations comprising:
   enabling performance of a first write operation to a first memory device of a memory and a second write operation to a second memory device of the memory, wherein performing the first write operation and the second write operation causes communications between the memory and a memory controller associated with a first data mask line coupled to the first memory device and associated with a second data mask line coupled to the second memory device, and wherein the communications comprise:
   providing a first enable signal to a first data mask driver of the first memory device after completing the first write operation, wherein the memory controller selectively masks first write data during the first write operation via the first data mask line;
   providing first status information from the first memory device to the memory controller via the first data mask line, wherein the first enable signal enables communication of the first status information to the memory controller via the first data mask line;
   providing second status information from the second memory device to the memory controller on the second data mask line;
   enabling the second memory device to perform the second write operation; and
   providing a disable signal to a second data mask driver of the second memory device upon enabling the second memory device to perform the second write operation, wherein the memory controller selectively masks second write data during the second write operation via the second data mask line.

30. The non-transitory computer-readable medium of claim 29, wherein the communications further comprise providing a data mask from the memory controller to the second memory device while the memory controller is performing the second write operation to the second memory device.

31. A non-transitory computer-readable medium comprising instructions that, when executed by a processor, cause the processor to perform operations comprising:
   enabling performance of a first write operation to a first memory device of a first memory rank of a memory and a second write operation to a second memory device of a second memory rank of the memory, wherein performing the first write operation and the second write operation causes communications between the memory and a memory controller associated with a first data mask line coupled to the first memory device and associated with a second data mask line coupled to the second memory device, and wherein the communications comprise:
   providing a first enable signal to a first data mask driver of the first memory device after completing the first write operation, wherein the memory controller selectively masks first write data during the first write operation via the first data mask line;
   providing first status information from the first memory device to the memory controller on the first data mask line, wherein the first enable signal enables communication of the first status information to the memory controller via the first data mask line;
   providing second status information from the second memory device to the memory controller on the second data mask line;
   enabling the second memory device to perform the second write operation;
   providing a disable signal to a second data mask driver of the second memory device upon enabling the second memory device to perform the second write operation, wherein the memory controller selectively masks second write data during the second write operation via the second data mask line; and selectively providing a data mask from the memory controller to the second memory device on the first data mask line while the memory controller is performing the second write operation.

32. The non-transitory computer-readable medium of claim 31, wherein the communications further comprise placing the first memory device in the first memory rank into a state that does not load the first data mask line while the memory controller is performing the second write operation.

33. An apparatus comprising:
means for storing first write data, the means for storing the first write data including a first data mask driver;
means for storing second write data, the means for storing the second write data including a second data mask driver; and
means for selectively masking the first write data and the second write data, wherein the means for selectively masking the first write data and the second write data is coupled to the means for storing the first write data via a first data mask line and to the means for storing the second write data via a second data mask line,
wherein the means for selectively masking the first write data and the second write data tri-states the first data mask driver to enable selective masking of the first write data during a first write operation via the first data mask line,
wherein the means for storing the second write data is responsive to the means for selectively masking the first write data and the second write data to tri-state the second data mask driver to enable selective masking of the second write data during a second write operation via the second data mask line,
wherein the means for storing the first write data provides first status information to the means for selectively masking the first write data and the second write data via the first data mask line when the first write operation is not being performed, and
wherein the means for storing the second write data provides second status information to the means for selectively masking the first write data and the second write data when the second write operation is not being performed.

34. The apparatus of claim 33, wherein the means for storing the first write data comprises a first memory device, wherein the means for storing the second write data comprises a second memory device, and wherein the means for selectively masking the first write data and the second write data comprises a memory controller.

35. An apparatus comprising:
means for storing first write data, wherein the means for storing the first write data includes a first memory device;
means for storing second write data, wherein the means for storing the second write data includes a second memory device; and
means for selectively masking the first write data and the second write data, wherein the means for selectively masking the first write data and the second write data is coupled to the means for storing the first write data via a first data mask line and to the means for storing the second write data via a second data mask line,
wherein the first write data is selectively masked during a first write operation via the first data mask line for a first time period,
wherein the means for storing the first write data provides first status information from the first memory device to the means for selectively masking the first write data and the second write data via the first data mask line after the first time period,
wherein the second write data is selectively masked during a second write operation via the second data mask line for a second time period, and
wherein the means for storing the second write data provides second status information from the second memory device to the means for selectively masking the first write data and the second write data via the second data mask line after the second time period.

36. The apparatus of claim 35, wherein the means for storing the first write data comprises a first memory rank, wherein the means for storing the second write data comprises a second memory rank, and wherein the means for selectively masking the first write data and the second write data comprises a memory controller.

* * * * *